Figure 1:
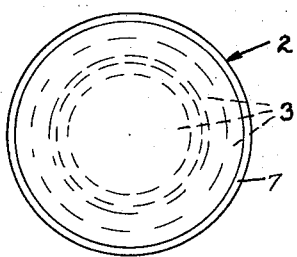

March 28, 1944.  J. H. FOX  2,345,336

BULLET-RESISTING GLASS

Filed Dec. 28, 1940

Inventor
JOHN H. FOX

By Olen E. Bee
Attorney

Patented Mar. 28, 1944

2,345,336

UNITED STATES PATENT OFFICE 2,345,336

BULLET-RESISTING GLASS

John H. Fox, Pittsburgh, Pa., assignor to Pittsburgh Plate Glass Company, Allegheny County, Pa., a corporation Application December 28, 1940, Serial No. 372,055

2 Claims. (Cl. 109—58.5)

The present invention relates to vehicular glazing and more particularly to bullet-resisting transparencies for aircraft.

One object of the invention is the provision of a laminated glass which will exhibit increased resistance to missile penetration.

A further object of the invention is to provide a glazing assembly in which the area for possible direct penetration is restricted while the field of visibility therethrough is not appreciably diminished.

Other objects and advantages of the invention will become more apparent from the following detailed description of a preferred embodiment thereof.

Laminated glass comprising a plurality of glass plates united by intermediate layers of thermoplastic material has been used heretofore to form vehicular windshields and windows. By increasing the number of laminae in the composite unit, the thickness of the several glass plates and the reinforcing interlayers, it has been possible to produce a laminated glass through which a bullet of light or medium calibre will not penetrate.

More recently, however, the size of armament employed in aerial warfare has been enlarged and the combination of heavier missiles and higher velocities has greatly reduced the protective value of the so-called "bullet-proof" glasses. It might be possible to apply additional layers of glass and plastic to the composite units to build up their resistance to the bullet impact, but a plate of this nature would be highly impractical. Not only would it be difficult to mount in a supporting frame but also its weight would constitute a serious factor precluding its use in aircraft and again the light transmission would be diminished to too large an extent.

The fighting planes of today are so designed that the pilot is almost completely protected by armor plate. The cockpit housing must, however, be transparent for maximum visibility, and it is at this place that protection must be afforded. Since modern aerial warfare is conducted at high speeds, flank attacks are almost impossible and it is only necessary to guard against gun-fire from the front and rear. The rear can be protected by armor plate extending upwardly behind the pilot's seat and head-rest and only the relatively small areas of the cockpit housing lying directly in front of the pilot need be reinforced.

In one practical form the present invention contemplates the creation of a bullet-resisting glass from plates laminated in the form of a truncated cone, surrounding it by a close fitting frame, and mounting it directly behind the windshield in such manner that the outward expansion of the glass plates occasioned by bullet penetration will be counteracted by a wedging action and compression resulting as the composite unit is forced into the supporting frame.

Figure 2:
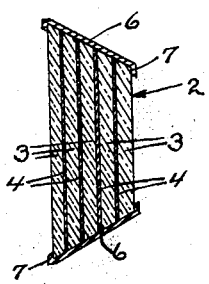
Figure 3:
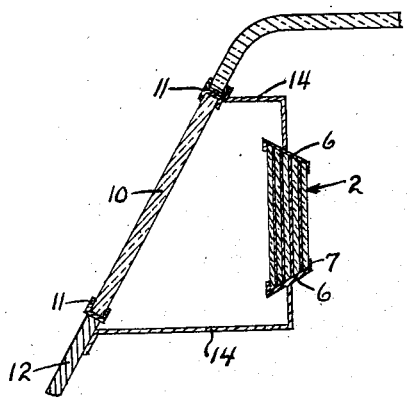

In the drawing, Figure 1 is a plan view of a bullet-resisting glass embodying my inventive concept. Figure 2 is a vertical sectional view thereof, and Figure 3 is a fragmentary vertical sectional view of an aircraft cockpit showing one means of mounting the bullet-resisting glass.

Referring to the drawing, a laminated glass shield 2 comprises a plurality of discs 3 of glass bonded together by layers 4 of a thermoplastic material, such as a vinyl butyral resin, or other reinforcing material commonly used in the preparation of laminated glass. The glass discs 3 may be of uniform thickness or various combinations of heavy and light glass may be used as is the custom in bullet-proof glass. The layers of plastic material may also be thicker than ordinarily employed if it is so desired.

The glass discs 3 are of gradually diminishing diameter and the edges are beveled in order that the composite article assumes the shape of a truncated cone. A heavy metal frame 6 is positioned about the assembly, inwardly extending flanges 7 securing it thereto. It will be observed that the frame 6 contacts directly the edges of the glass discs 3 and no cushioning member is interposed therebetween.

The shield 2 is mounted directly behind a windshield 10, of ordinary or laminated glass, secured by the channels 11 to the fuselage 12 of an airplane, by means of angle plates 14 extending rearwardly from the windshield supporting structure and fastened to the frame 6. The angle plates are preferably of armor steel to form a protective barrier behind the windshield 10 broken only by the laminated glass shield 2.

The laminated glass shield 2 is so positioned that the base of the truncated cone faces in spaced relation the rear side of the windshield 10. In this manner the field of visibility is not materially decreased for the natural refraction of light will permit a maximum range of visibility through the small portion of the frustum.

When a missile enters the airplane fuselage through the windshield 10, it strikes the front disc of the shield 2 and begins penetration thereof. The forward motion of the missile forces the conic glass sections into the frame 6 and this results in a compression of the glass discs 3. The compression set-up in this manner will offset the expansion of these discs occasioned by the missile passing therethrough and the resistance to penetration is, accordingly, greatly increased.

Missiles striking the shield near the edge, where the full wedge action cannot result, will be arrested or deflected by the metal frame 6. Missiles penetrating the windshield 10 at an angle so great that they miss the shield 2 will be stopped by the supporting plates 14.

It will at once be apparent that various modifications in the construction of the laminated glass shield and its mounting are possible without departing from the spirit of the invention or the scope of the appended claims.

What I claim is:

1. In an airplane having a pilot compartment and including a front glass windshield constituting an outer wall section of the compartment, a bullet-resisting unit of truncated cone form including glass plates united by interlayers of plastic material, and a rigid frame closely engaging the periphery of said unit, the base of the truncated cone unit facing the outer windshield in spaced relation thereto.

2. In an airplane having a pilot compartment and including a front glass windshield constituting an outer wall section of the compartment, a bullet-resisting unit including substantially vertical glass plates united by interlayers of plastic material and disposed in a position spaced behind said windshield, the periphery of said unit converging from front to rear corners thereof, a surrounding, rigid frame closely engaging said unit throughout its periphery in wedging relation in response to force exerted rearwardly on said unit, and means for mounting said frame in the compartment.

JOHN H. FOX.